(12) United States Patent
Lal et al.

(10) Patent No.: US 8,799,149 B2
(45) Date of Patent: Aug. 5, 2014

(54) LOYALTY REWARDS OPTIMIZATION BILL PAYABLES AND RECEIVABLES SERVICE

(75) Inventors: Raghav Lal, Palo Alto, CA (US); Alfred Chin, Los Altos, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1049 days.

(21) Appl. No.: 12/424,241

(22) Filed: Apr. 15, 2009

(65) Prior Publication Data

US 2010/0268588 A1 Oct. 21, 2010

Related U.S. Application Data

(60) Provisional application No. 61/045,563, filed on Apr. 16, 2008, provisional application No. 61/045,581, filed on Apr. 16, 2008.

(51) Int. Cl.
  *G06Q 40/00* (2012.01)
(52) U.S. Cl.
  USPC .................................. 705/38; 705/39; 705/35
(58) Field of Classification Search
  USPC .............................................. 705/35, 14, 38
  See application file for complete search history.

(56) References Cited

U.S. PATENT DOCUMENTS

| 7,926,714 B1 | 4/2011 | Zhu |
| 2005/0192899 A1 | 9/2005 | Reardon |
| 2005/0251446 A1* | 11/2005 | Jiang et al. ............... 705/14 |
| 2006/0027647 A1* | 2/2006 | Deane et al. ............. 235/380 |
| 2006/0161478 A1 | 7/2006 | Turner et al. |
| 2006/0266821 A1* | 11/2006 | Zajkowski et al. ....... 235/380 |
| 2007/0198335 A1 | 8/2007 | Edwards et al. |
| 2008/0004992 A1 | 1/2008 | King et al. |
| 2011/0022514 A1 | 1/2011 | Lal |

FOREIGN PATENT DOCUMENTS

| KR | 10-2007-0075985 | 7/2007 |
| WO | 2009129421 | 4/2009 |

OTHER PUBLICATIONS

International Patent Application PCT/US09/40875, International Search Report and Written Opinion, Oct. 28, 2009.

* cited by examiner

*Primary Examiner* — Ojo Oyebisi
(74) *Attorney, Agent, or Firm* — Greenberg Traurig LLP

(57) ABSTRACT

For several accounts receivable, a reward account is determined as the account that receives the largest deposit to the loyalty reward balance thereof by a payment of the account receivable. For each reward account, a deficient reward account is found if the currency balance for the reward account is not sufficient for the payment of the account payable. For each deficiency reward account, if identified accounts receivables can be deposited such that the currency balance thereof will be sufficient to pay the account payable, then payments are made of: (i) the identified accounts receivables as corresponding deposits to the currency balance of the deficiency reward account such that the currency balance thereof is sufficient for the payment of the account payable; and (ii) the account payable by a withdrawal from the currency balance of the deficiency reward account.

21 Claims, 13 Drawing Sheets

500

Basic Integration:

---

For each payer:
    For each account:
        Retrieve transaction history for account:
        Auto-populate payee list

— 502

↓

Generate merchant directory (small merchants)

— 504

↓

Expand payee list by incorporating merchants that would otherwise be paid via checks/Automated Clearing House (ACH)

Identify Merchant Acceptance Targets: — 902

Issuers log in and view merchant acceptance reports

System Response: Provides issuer with access to reports such as: transaction volume and count by merchants/suppliers who are not Visa card acceptors. Reports can be segmented by MCC and geography.

Issuers can offer report results to acquirers as merchants to target

— 904

— 906

Alternative flow:

1) When CH pay merchants who don't accept Visa, they can also configure the payment request to ask for that particular merchant to be added as an acceptor. Visa may also be able to use this information at a Visa-wide level.

2) Issuers can also send messages to CH that of the merchants they are paying with using this solution – do they know that X may be paid with their payment cards and thereby allow them to benefit from rewards etc…

Figure 9

LOYALTY REWARDS OPTIMIZATION BILL PAYABLES AND RECEIVABLES SERVICE

CROSS NOTING

The application claims priority to U.S. Provisional Application Ser. No. 61/045,563, filed on Apr. 16, 2008, titled Electronic Bill Payment Solution For Small Business, and to U.S. Provisional Application Ser. No. 61/045,581, filed on Apr. 16, 2008, titled Small Business Bill Pay and Receivables Service, both of which are incorporated herein by reference.

FIELD

Implementations generally relate to accounts payable and accounts receivable, and more particularly, to automatic electronic processing of accounts payables and receivables.

BACKGROUND

Small businesses regularly use online services to conduct various aspects of their work. As such, doing business 'online' is a preferred channel of an increasing significant portion of small businesses. While checking accounts are often the "anchor" products that establish a small business banking relationship with a small business, small businesses are increasingly willing to complete transactions online. Such transactions range from paying bills to invoicing. Only a small percentage of small businesses manage their cash through their bank's business banking/cash management solutions. Although an increasingly significant percentage of small businesses pay some of their bills online, few do so at their bank's website.

Sometimes payment volume growth within a payment processing system, such as growth in the us of credit and debit cards (i.e., Visa, MasterCard, etc.) for payments, is limited by small businesses not accepting payment by payers that wish to use their credit and debit cards to pay. One reason that the small businesses may not accept such payments by the payers is the cost of terminalization or installing an maintaining a machine to accept payments from credit and/or debit accounts. Terminalization is particularly costly for payees that are small and/or are infrequent recipients of payments upon such accounts of payers. Moreover, some acquiring banks of such small business that do not accept payments from credit and debit accounts as the acquirers are reluctant to process such payments for the small businesses. As such, being ties to payments by cash and checks, small businesses generally lack tools necessary to enable electronic accounts receivables in a fast, low cost manner. Accordingly, it would be an advance in the relevant arts to provide small businesses with a simple and easy to use electronic invoicing and bill payment application with other advantages as well.

SUMMARY

In one implementation, a small businesses can gain the benefits of electronic receivables and payables, with loyalty rewards optimization, without a cost of setting up individual Point of Service terminals (POS) or Electronic Commerce (e-Commerce) websites for each participating payer/payee.

In one implementation, a portion of small business's receivables from checks and money orders are migrated to an electronic form, thereby improving timeliness and auditability in an accounts receivable/payable process. Cardholders (e.g., payees) can easily receive payments into the account of the corresponding payee from the payer. For example, payees can accept payments made payable upon a payer account (the account of the payer in the payment processing system) by accepting the payment into a payee account (the account of the payee in the payment processing system).

In another implementation, cardholders are provided with a payment system to bill/invoice their consumers by enabling them to create reports on various items, such as outstanding or aging invoices that have not yet been paid by the consumer.

In another implementation, the payee can enroll in a payment system as a merchant that accepts payments made payable upon a payer account and/or can receive payments from others into the payee's account depending upon the preference that the payee has preselected.

In yet another implementation, for several accounts receivable, a reward account is determined as the account that receives the largest deposit to the loyalty reward balance thereof by a payment of the account receivable. For each reward account, a deficient reward account is found if the currency balance for the reward account is not sufficient for the payment of the account payable. For each deficiency reward account, if identified accounts receivables can be deposited such that the currency balance thereof will be sufficient to pay the account payable, then payments are made of: (i) the identified accounts receivables as corresponding deposits to the currency balance of the deficiency reward account such that the currency balance thereof is sufficient for the payment of the account payable; and (ii) the account payable by a withdrawal from the then sufficient currency balance of the deficiency reward account.

BRIEF DESCRIPTION OF THE DRAWINGS

Implementations will become more apparent from the detailed description set forth below when taken in conjunction with the drawings, in which like elements bear like reference numerals.

FIGS. 4-8 depict flowcharts of respective exemplary methods, each of which can be performed in the payment processing system of FIG. 13, and by which a payer can enroll and be set up to be a payer in an online accounts payable and accounts receivable application;

FIG. 9 depicts a flowchart of an exemplary method, that can be performed in the payment processing system of FIG. 13, for an issuer to target merchant-suppliers who accept only cash-like payments for their invoices;

DETAILED DESCRIPTION

In one implementation, a debt, such as a bill or a purchase order, that a payer owes to a payee is automatically processed. The payer can pay the debt from an account that is a revolving credit or debit account. The account from which the payer pays the payee can also be used to receive payments owned to the payer by others. As such, the payer need not have a Point of Service terminal (POS) in order to make deposits into the account from which the payer pays its debts. Moreover, via the functionalities provided by the implementation, the payer gains the benefits of electronically paying and being paid without the cost of setting up a POS or an Electronic Commerce (e-Commerce) website.

Figure 13:
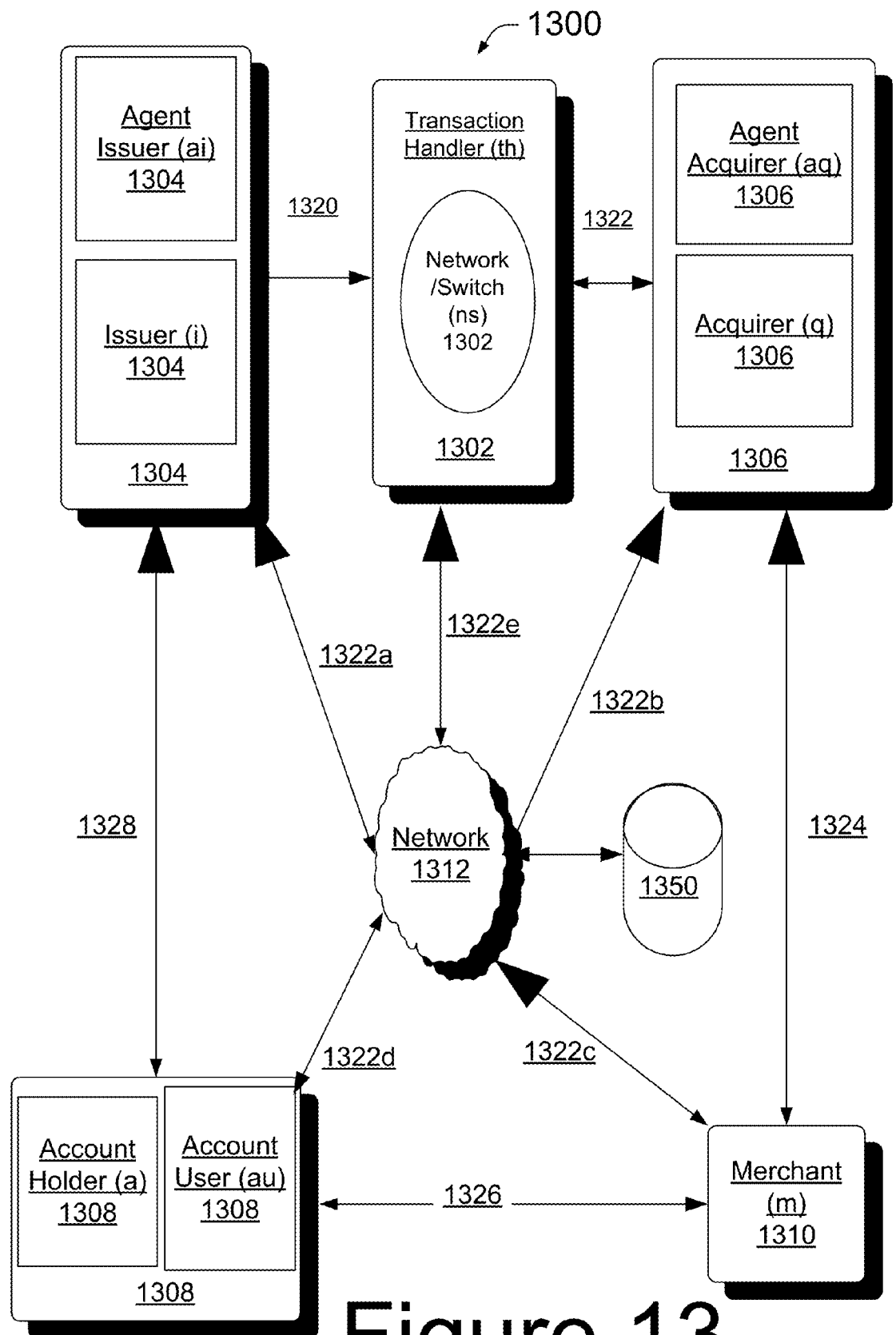
FIG. 13 depicts a block diagram of an exemplary payment processing system.

The payee, to whom the payer is a debtor, may be a person or entity that leases, licenses, or sells a good, service, or both to the payer. Each of the payer or the payee may be a business entity engaged in a business-to-business trade or an individual engaged in individual-to-individual trade. Moreover, individual-to-business or business-to-individual trade is also contemplated. As disclosed in application in which a payer can be a consumer that has an account within a payment processing system, such as is depicted in FIG. 13. A merchant is a payee that accepts payments upon the consumer's account within the payment processing system. The payment processing system is a system in which a transaction handler processes multiple transactions that are each characterized by the consumer and the merchant engaging in one of the transactions upon the account within the payment processing system. In the payment processing system, an issuer issues the account to the consumer, and the merchant submits a transaction conducted with the consumer to an acquirer for processing by the transaction handler. In turn, the transaction handler requests the issuer to disburse funds from the consumer's account to pay for the transaction. The issuer forwards the funds to the transaction handler who forwards the funds to the acquirer to disburse the funds into an account for the merchant. As such, the merchant is paid for the transaction that was conducted with the consumer.

Bill payments or invoice-based spend can be processed within a payment processing system as disclosed herein. In one implementation, payments are made between businesses (e.g., merchants or payers to payees) using an account that has been issued by an issuer within the payment processing system. For example, the payer can use its corresponding account within the payment processing system to pay a small business (e.g., payee) that does not otherwise offer an online payment facility. This capability can add value to the payer and/or payee that wishes to extend the benefits of each of their corresponding accounts. For example, the payer may make use of a credit line associated with their account in order to pay its payees, thus consolidating the payer's business expenses by use of the payer's account. In so doing, the payer's use of the account issued to them by an issuer will earn a reward for loyalty in a particular loyalty currency. Such a currency may be paid to the account holder, for instance, by the issuer of the account. The reward currency is paid to the payer for using their account to make payments to payees. In would be advantageous to the payer to have multiple accounts issued to the payer by one or more issuers, where the reward currency that is paid to the payer for use of the corresponding account can be maximized. For instance, one account can be used to pay for airfare so as to realize a reward currency that is twice that of using any other of the payer's accounts. As such, the payer would do well by paying a debt for airfare from the account that pays back to the payer the highest reward currency.

In one implementation, a portion of a small business's receivables from checks and money orders are migrated to an electronic form, thereby improving timeliness and auditability in an accounts receivable and accounts payable process. Account holders, also referred to herein as cardholders or 'CH', as payees, can receive payments into their accounts from one or more payers. For example, payees can accept payments made payable upon a payer account (the account of the payer in the payment processing system) by accepting the payment into a payee account (the account of the payee in the payment processing system). Advantageously, the payers/account holders/cardholders, are thereby provided with the means to bill/invoice their payees/consumers, and create reports on significant items such as outstanding or aging invoices that have not yet been paid by their payees/consumers.

Figure 1:
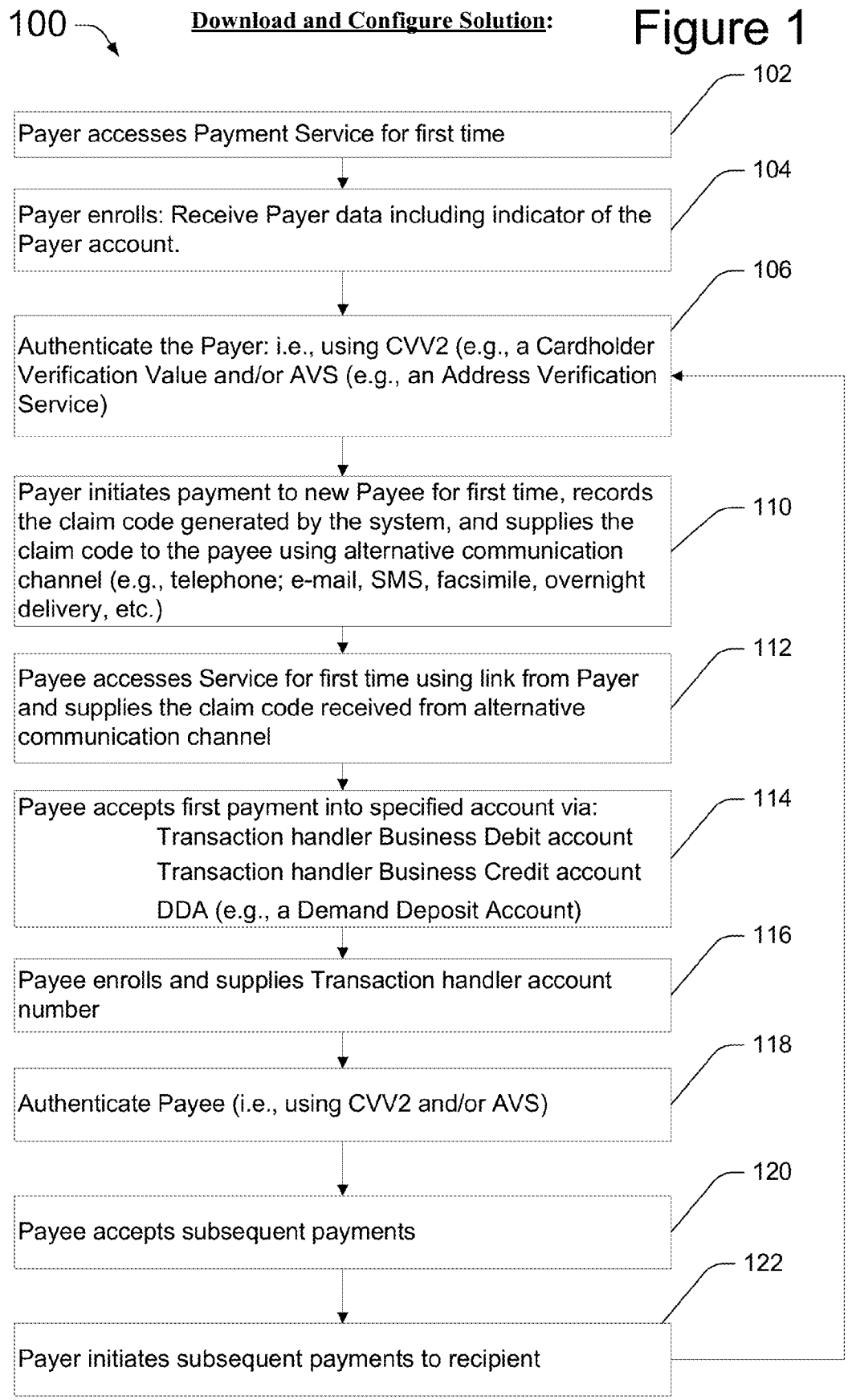
FIGS. 1-2 depict flowcharts of respective exemplary methods, each of which can be performed in a payment processing system depicted in FIG. 13, and by which a payer and a payee can, respectively, go online to pay and be paid.

Turning now to FIG. 1, a flowchart depicts a method 100 which can be performed in a payment processing system depicted in FIG. 13 and described below. Method 100 permits a payer to enroll in a payment processing service that allows the payer to make payments to payees from an account issued to the payer by an issuer, as well as to enroll to accept payments into the account from others, depending upon the preference that the payee has preselected.

At step 102 of Method 100, the payer accesses the payment service for the first time. This access can be by an application executing on a client, where the client is in communication with a web service for the payment service (e.g., a payment processing service). For instance, the client application can be special purpose software or a general purpose browser application for the World Wide Web.

At step 104, the payer enrolls to participate in the payment service. At step 106, the payer interacts through a user interface (not shown) of the application executing on the client to supply an identifier for an account that has been issued by an issuer to the payer. An Cardholder Verification (CVV2) and/or an Address Verification Service (AVS) for the account is used by the payment service to authenticate the account for use by the payment service.

At step 110, by interacting through the user interface (not shown) rendered by the client, the payer initiates payment to a new payee for the first time and is supplied with a 'claim code'. The claim code can be a globally unique identifier for the payment to the payee that the payer is making on the payer's account. The payer records the claim code generated by the payment service, and supplies the claim code to the payee. The claim code can be supplied to the payee using the payment service or by use of an alternative communication channel (e.g., telephone; e-mail, SMS, facsimile, overnight delivery, etc.)

At step 112, the payee, who is specified for being paid at step 110, accesses the payment service for first time by using information received from the payer, such as by navigation on a client executing a browser from a hyperlink in an electronic mail (e-mail) received from the payer. The payee then supplies the claim code received from the payer to the user interface (not shown) rendered by the client being operated by the payee.

At step 114, the payee accepts the payer's first payment into an account that is specified by the payee, where the payee was issued that account by an issuer. The payee's account, into which the payer's payment is to be received, can be a debit account, a revolving credit account, a Demand Deposit Account (DDA), a prepaid account, etc.

At step 116, the payee completes their enrollment in the payment service and supplies, via network communications between the client and the payment service, information about the payee's account into which payments are to be received. This information about the payee's account is further communicated to one or more transaction handlers, or agents thereof, for further authentication, clearing and settlement, etc.

At step 118, information about the payee's account is authenticated by the payment service through a corresponding CVV2 and/or AVS for the payee's account. If the payee's account is thereby authenticated, then the payment from the payer can be accepted into the payee's account at step 120.

Method 100 loops back at step 122 to step 106 so that the payer can continue to pay other payees (i.e., to perform other accounts payable functions). The steps of method 100 can be performed automatically by applications executing in the payment service and the client with which the payment service is communicating. As such, little or no interactivity is needed by a person in this computer implemented accounts payable and accounts receivable method, but rather can be implemented as a technical effect of software executed by hardware with access to various data.

Figure 2:
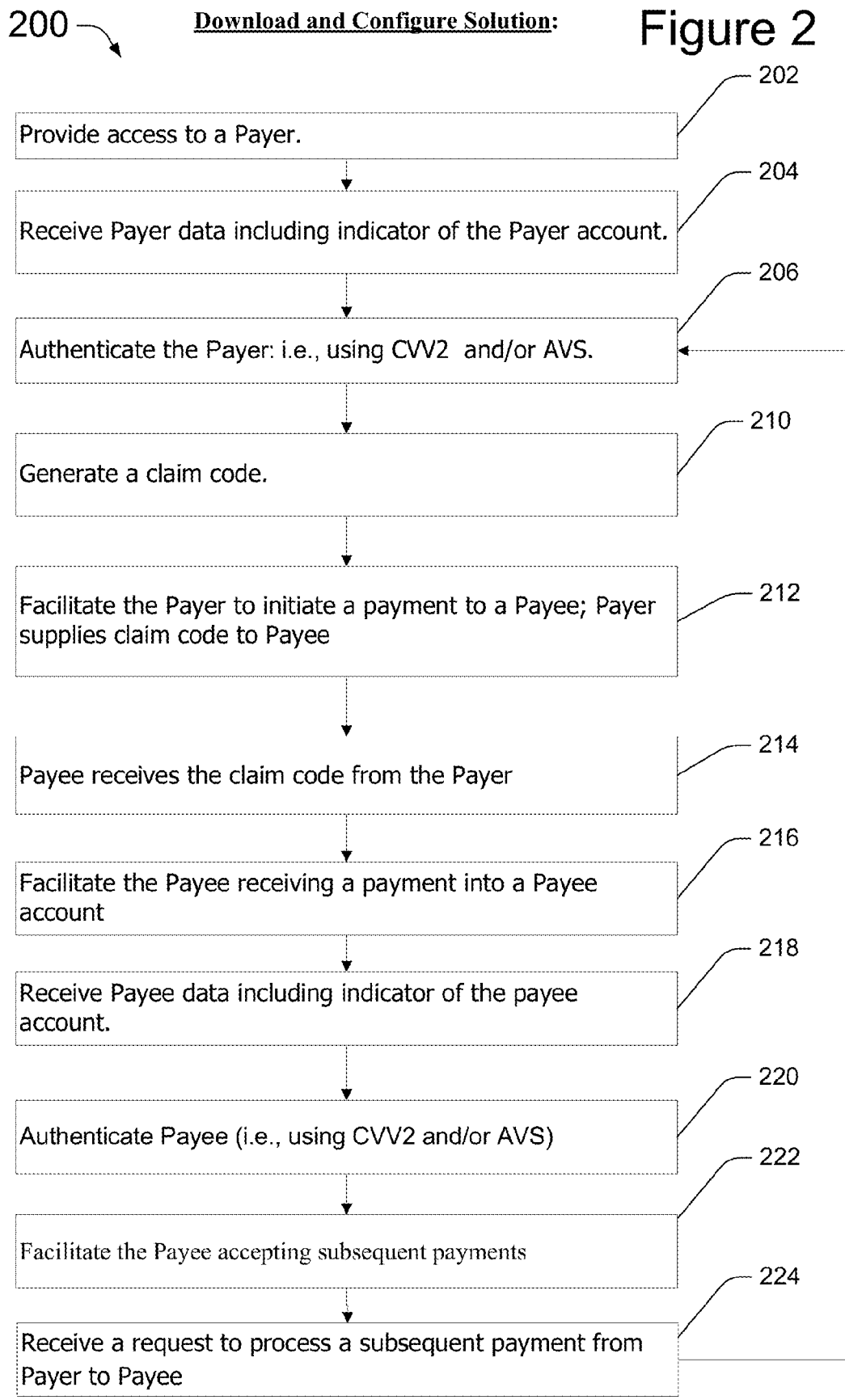

Similar to Method 100 in FIG. 1, Method 200 in FIG. 2 provides steps 202 through 224 for a payer to access, enroll, and use a payment service that focuses upon one or more accounts each being previously issued by a respective issuer to the payer. Upon authentication of an account issued to the payer by an issuer at step 206, the payer can designate payments to be made from their account to payees at step 212. As with Method 100, Method 200 provides step 212 to issue to the payer a claim code for each payment that the payer wishes to make. The payee, upon receipt of a corresponding claim code from the payer at step 214, can receive payment at step 216 via supplying information at step 218 to the payment service about an account into which the payee wishes to receive the payer's payment. The account, which was issued to the payee by an issuer, is similarly authenticated as was the payer's account, for instance by use of a corresponding CVV2 and/or AVS. With a successful authentication, other payments corresponding to other claim codes received from the same or other such payers can be received as respective deposits into the payee's account. At step 224, subsequent such payments from payers to the payee can be initiated through the loop back shown in the flowchart to step 206 for further processing.

As is common in some kinds of account that are issued by issuers, a reward of some value of a loyalty currency can be awarded to an account holder in exchange for the account holder conducting a transaction with a merchant on the account. In such a transaction, the merchant is to be paid from a currency balance in the account holder's account. Typically, the reward is paid by the issuer of the account, by a co-sponsor of the account with the issuer, by another party, by an agent of the foregoing, or by a combination of the foregoing entities. For example, a reward can be paid in the currency of frequent flyer miles by an airline co-sponsor of a Visa account, where the Visa account was issued to the account holder by a financial institution, bank, or credit union (i.e., Wells Fargo). These frequent flyer miles are paid into a loyalty reward account having a loyalty reward balance, where both the loyalty reward account and its loyalty reward balance are associated with the account holder's account. Thus, the currency of the frequent flyer miles given as a reward to the account holder for purchasing airline passage from the co-sponsoring airline results in an increase of the loyalty reward balance in the loyalty reward account. In another example, each time that the account holder conducts a transaction with a merchant upon a different account, for instance a Discover Card account issued to the account holder, a reward will be given to the account holder in the form of a percentage of the value of the transaction. For instance, the currency balance of the account may be increased by Ten Dollars ($10 US) for each One Thousand Dollars in transactions that are conducted by the account holder with merchant when the account holder's Discover Card account is used to conduct the transactions. Taking together, these two examples shown that the account holder has a plurality of accounts—each being issued to the account holder by a different issuer (i.e., Wells Fargo and Discover Card). Each account has a currency balance and is also associated with a loyalty reward balance. The loyalty reward balance for the Wells Fargo account is held in a loyalty reward account in which the currency is frequent flyer miles. The loyalty reward balance for the Discover Card account is held in the same account as was issued for Discover Card and is in the form of US dollars.

Regardless of a currency of a loyalty reward account into which awards are deposited, a value can be placed upon the currency. The value may be determined by a secondary market (i.e., where the reward currency can be traded for another currency). Alternatively, the value may be subjective to the account holder who sets a predetermined threshold value for a desired loyalty reward balance for the loyalty reward account. Either way, there is an economic advantage to the account holder, when selecting an account upon which to conduct a transaction with a merchant, to choose the account that will receive the largest deposit to the corresponding loyalty reward balance. Stated otherwise, it is economically advantageous for an account holder to optimize the selection from among each of their accounts the particular account that will get the best loyalty reward (i.e., the account that will receive the highest value reward as compared to the value of other rewards for the use of other accounts) for the particular transaction that the account holder will conduct with a corresponding merchant.

If, however, it is determined that the most highly rewarded account lacks a sufficient currency balance to conduct the desired transaction with the corresponding merchant, the currency balance must first be increased. To do so, it would be advantageous for the account holder to be able receive one or more direct deposits into that account so as to increase the currency balance thereof until the balance is sufficient to conduct the desired transaction and thereby receive the largest deposit to the loyalty reward balance.

Figure 3:
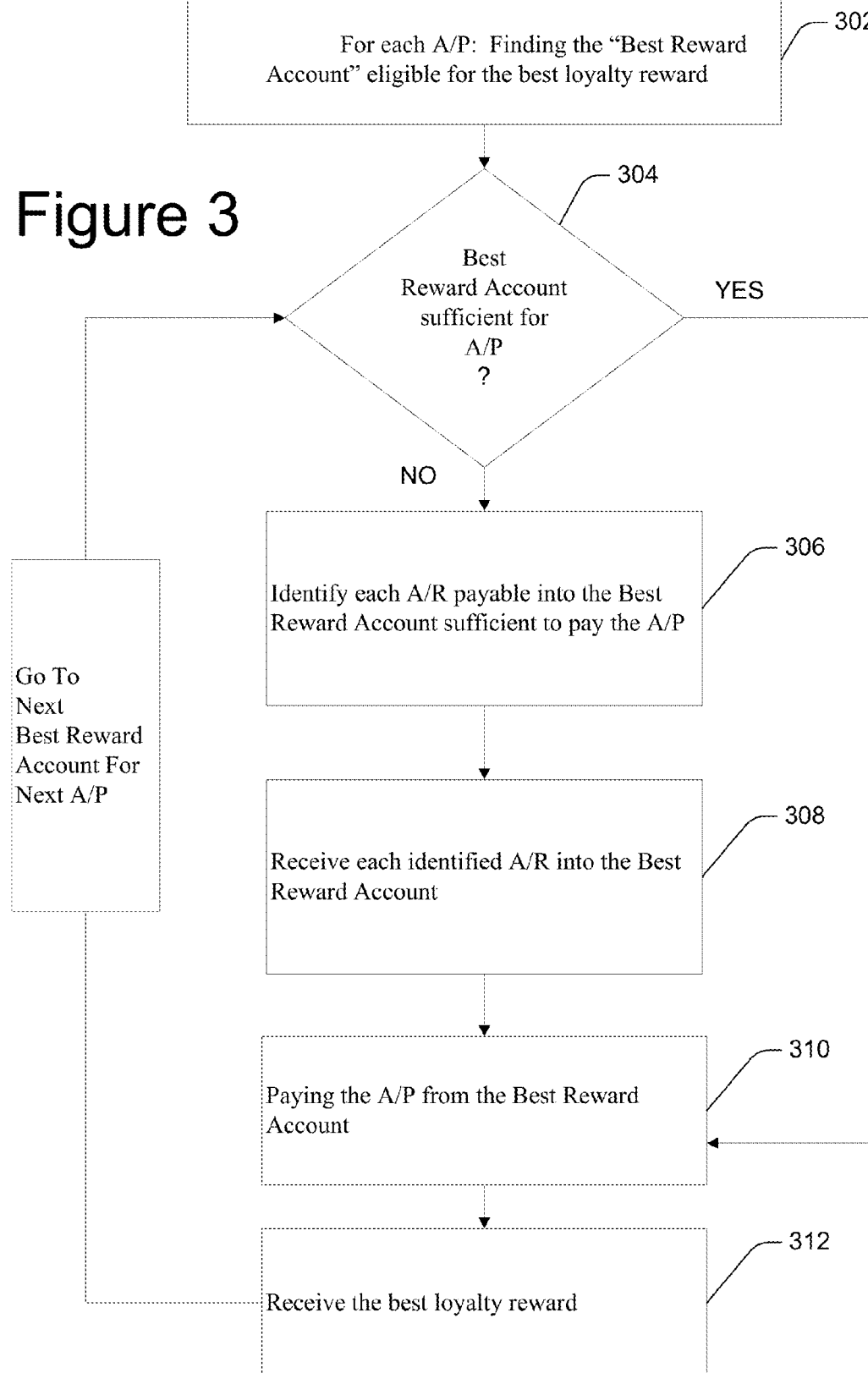
FIG. 3 depicts a flowchart of an exemplary method, that can be performed in the payment processing system of FIG. 13, for a payer to pay a payee using an account that will receive the best loyalty reward for such payment, where the payment is made possible by receiving one or more account receivable payments into the account prior to such payment.

Turning now to FIG. 3, a Method 300 provides an account holder with a rewards optimization routine by a selection of an account that pays the highest reward to make a payment of an accounts payable, and contingently increasing the currency balance thereof by one or more direct deposits of receivables sufficient to pay the accounts payment and thereby receive the highest reward.

At step 302, for each accounts payable (A/P) owed by an account holder to a payee, a process finds the "Best Reward Account", which is the account that was issued to the account holder and that is eligible for the best loyalty reward. Stated otherwise, the process finds which of the account holder's accounts that will receive the highest value reward for conducting the transaction as compared to the value of other rewards for the account holder's use of its other accounts to conduct the transaction. The process can involve, for instance, making queries on each of the account holder's accounts against each of the payees who take those accounts to determine and rank what each reward will be, evaluating the value of each reward relative to the others, and determining from this evaluation the account that will receive a payment of the greatest loyalty reward for using that account to pay that accounts payable.

After the highest rewarded account has been determined at step 302, a query is made at step 304 as to whether the currency balance of the account is sufficient to pay the accounts payable. If the currency balance is sufficient, the accounts payable is paid to the corresponding payee from the account at step 310 and the highest reward (e.g., optimized reward) is received at step 312. If the currency balance, however, is insufficient, at step 306 a determination is made as to which monies are owed to the account holder (i.e., accounts receivables) that can be paid directly into the highest rewarded account, where these deposits would raise the currency balance of the account so as to be sufficient to pay the accounts payable. The identified account receivable(s) are directly deposited into the highest rewarded account at step 308, the account payable is paid from the then sufficient currency balance of the highest rewarded account at step 310, and the highest reward (e.g., optimized reward) is received at step 312.

Method 300 loops as shown in FIG. 3 to attend to the next accounts payables and return for the processing thereof, as above, to step 304. As such, the account holder's use of the payment service optimizes rewards payable for use of the account holder's different accounts, while further ensuring such optimization by the receipt of deposits of the account holder's receivable(s) directly into the optimal account if the currency balance thereof is insufficient to pay the accounts payable.

Figure 4:
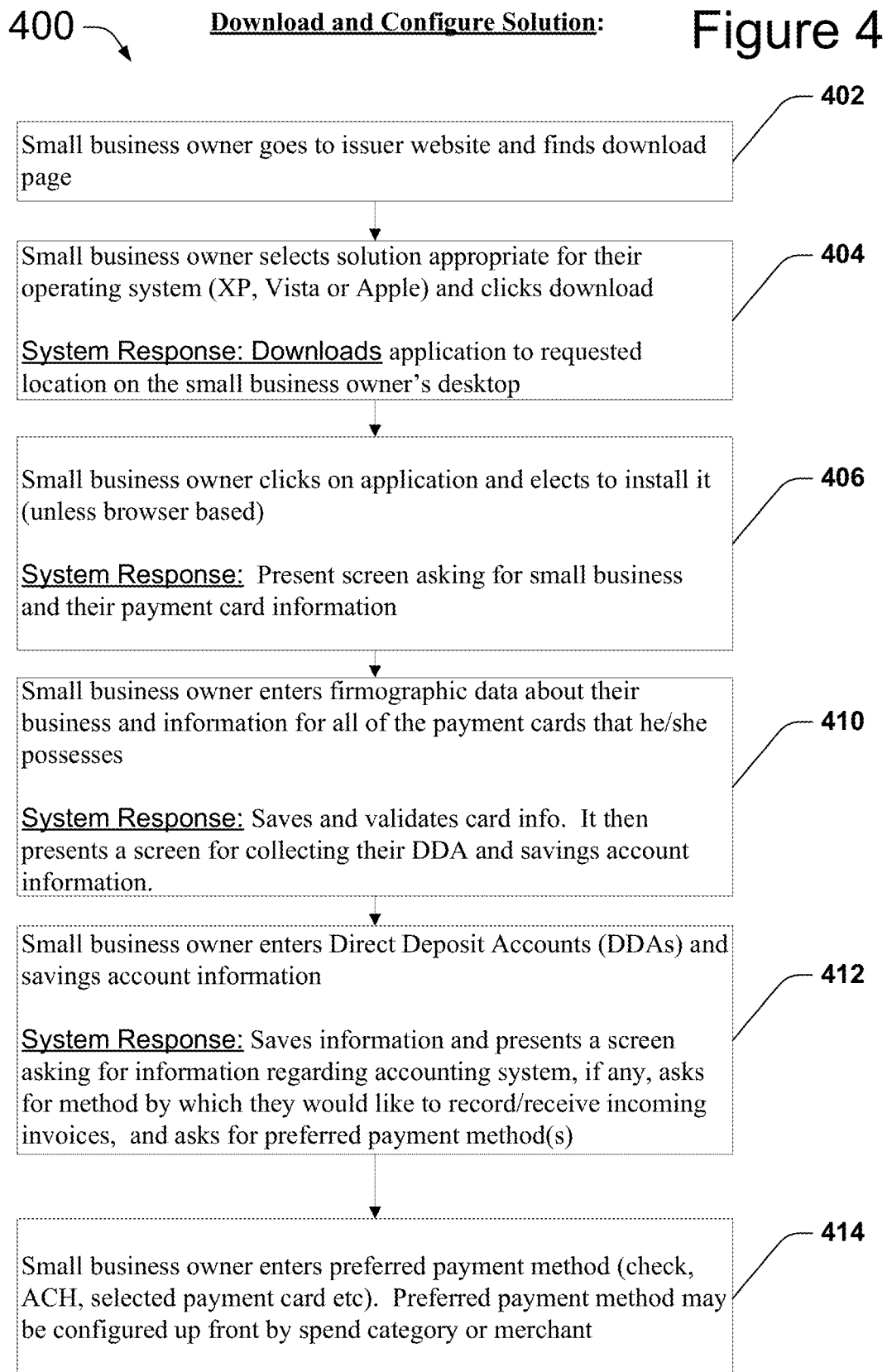
Figure 6:
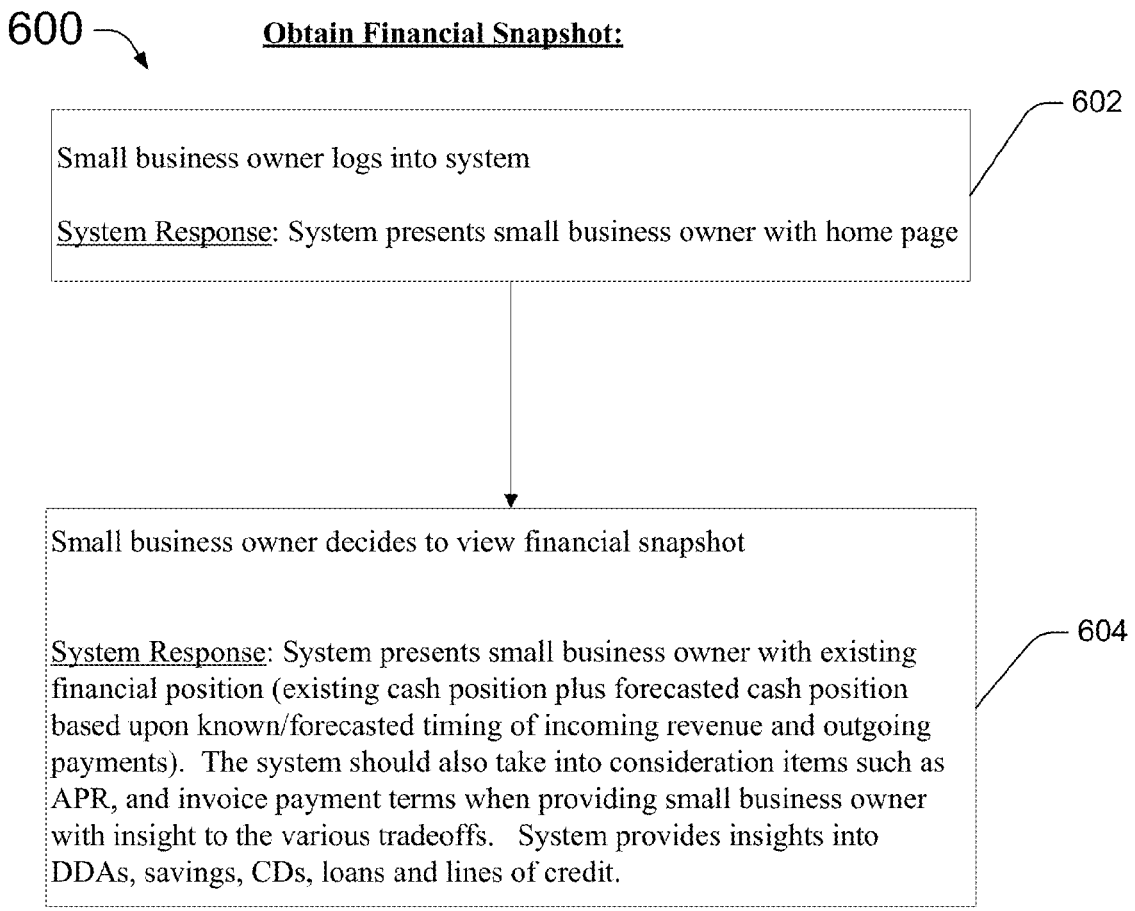
Figure 7:
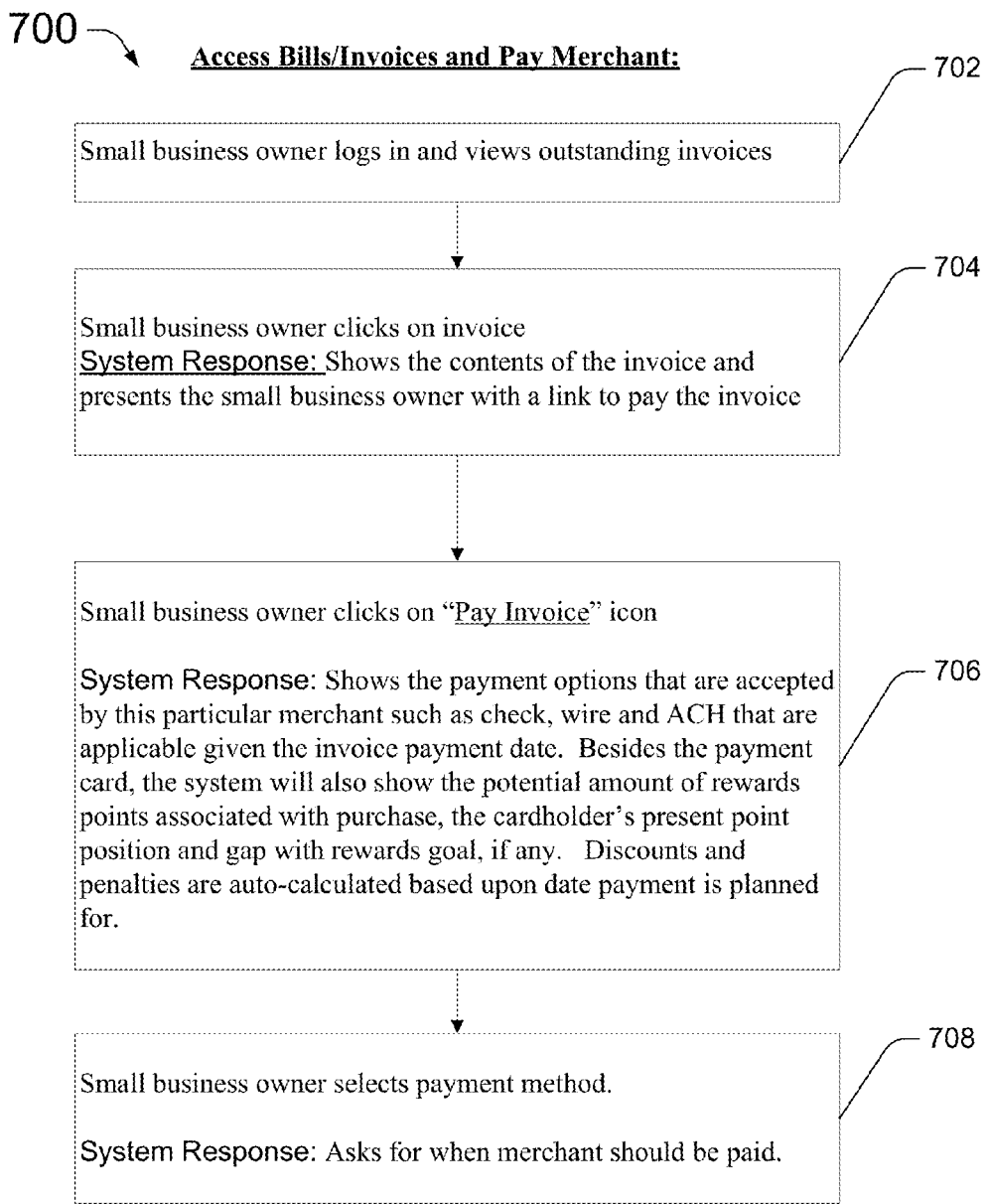
Figure 8:
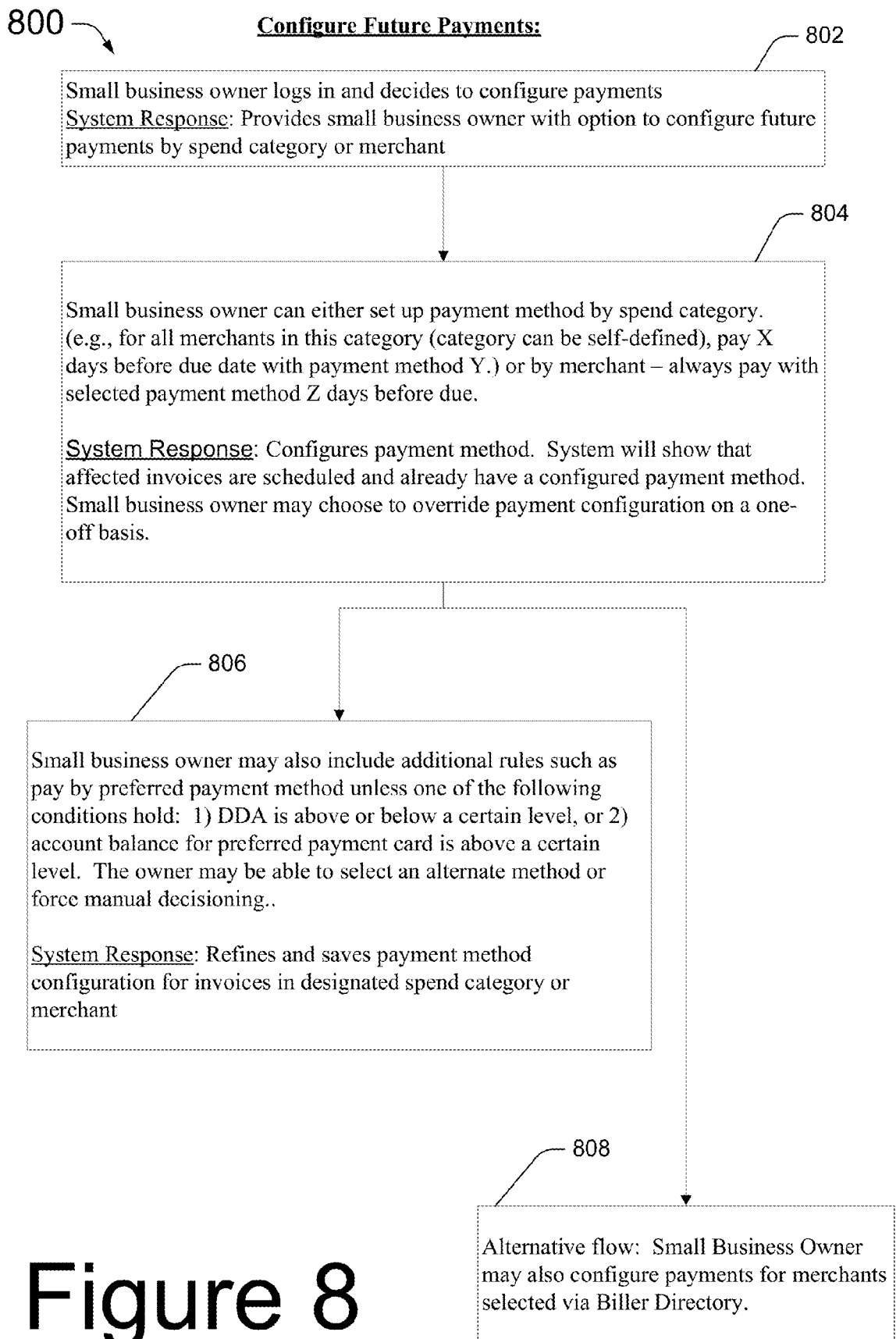

A client-server model for disclosed implementations of the payment service is contemplated, as are distributed processing models. One such implementation of a model is demonstrated by a Method 400 seen in FIG. 4, and depicting an interaction of a small business owner, who is operating a client, and a system response to the client. Method 400, which sets up the small business to attend to accounts payables, begins at step 402 at which a small business owner operates a client executing a browser to navigate on the World Wide Web to be served an issuer's web page by servers operating the issuer's website.

At step 404, the small business owner operates the client to select a solution appropriate for the client's operating system (.e., XP, Vista, Linux, OS/Apple, etc.) and 'clicks' download. The system responds by downloading the selected application to a requested location on the small business owner's desktop of the client.

At step 406, the small business owner operates the user interface rendered on the client to 'click on' the installed desktop application, and next elects to install the application. The client then installs the selected payment service application (unless the client is using a World Wide Web browser-based application). The system responds by presenting a display screen on the client's user interface that asks the small business owner for their payment account information.

At steps 410-414, the small business owner uses the user interface provided by the installed payment service application executing on the client to enter 'firmographic' data about their business and information for all of their payment accounts that he/she has been issued by one or more issuers and upon which the small business owner can conduct transactions with merchants. The system responds by saving and validating the input account information. This validation can be, for instance, by CVV2 and/or AVS as seen in Methods 200-300. The system responds by presenting a screen rendered as a user interface by the client that can be used by the small business owner to input, for the collection thereof, information pertaining to each of the small business owner's Direct Deposit Accounts (DDA) and savings accounts. The system responds by saving the entered information and presenting a screen asking for information regarding the accounting system, if any, that is used by the small business owner, a method by which the small business owner would like to record/receive incoming invoices, and preferred payment method(s). The preferred payment method(s) may be configured up front by spend category or by merchant, where one account is to be used when conducting a transaction for a predetermined category of goods and/or services, and a different account is used for a particular merchant.

A Method 500 is seen in FIG. 5, which begins at step 502, associates the payment service with each account of the small business owner (payer) that will be used to make a payment of an accounts payable. To do so, the payment service retrieves a history of prior transactions conducted on each account. The history of each account is used to auto-populate a list of those entities to which the small business owner has previously used its accounts to pay money and therefore will be likely to pay money using those same accounts, or the payer's other account(s), in the future. Other database(s) are cross referenced at steps 504-506 to obtain more information about those entities (e.g., merchants) who have conducted transactions on the accounts of the small business owners, including checking accounts, Direct Deposit Accounts (DDA), and Automated Clearing House (ACH) accounts.

In Method 600, in steps 602-604, the small business owner logs on to the payment service to see a financial snapshot of their business. The system responds by presenting an existing financial position (existing cash position plus forecasted cash position based upon known/forecasted timing of incoming revenue and outgoing payments). The system can also take into consideration items such as Annual Percentage Rate (APR) of monies borrowed, and invoice payment terms when providing the small business owner with insight to the various tradeoffs of making payments from, and receiving payments into, their various accounts. To do so, the system provides insights into DDAs, savings accounts, CDs, loans and lines of credit.

A method 700 shows a flowchart of steps by which a small business owner can make payments of current invoices that have been received as accounts payables. At step 702, the small business owner interacts with the user interface of the payment service installed on their client to log on and view outstanding invoices which have been retrieved by the payment system and rendered on the client. At step 704, the desired invoice to be paid is 'clicked on'. The system responds by showing the contents of the invoice, and presenting a navigation link to pay the selected invoice.

At step 706, a button labeled "Pay Selected Invoice", or similar marking, is 'clicked on'. The system responds by showing the payment options that are accepted by the merchant from whom the selected invoice was received. These options may include credit or debit account, check, wire and ACH, each of which may be applicable given the invoice payment date. Besides showing information about the currency balance for each account that could be used to pay the selected invoice, the system will also show the potential amount of loyalty reward currency (i.e., dollars, points, frequent flyer miles, cellular telephone minutes, in-kind rewards, etc.) associated with making the payment using the account of different payment options, the account holder's present loyalty reward balance for each such account, the gap between the present loyalty reward balance and a desired rewards goal or predetermined threshold reward loyalty reward balance, if any. Discounts and penalties are auto-calculated based upon a date that the payment is being planned for.

Given the small business owner's review of the foregoing information, a selection is made of the account from which the account payable is to be paid at step 708. In response, the system requests a payment date from the small business owner, which is entered at step 716. Alternatively, at step 710, the small business owner may search through a directory of merchants (biller directory) that the small business owner pays, select a merchant and then pay the selected merchant. The biller directory can also identify acceptable payment methods for each of the merchants listed in the biller directory.

A method 800 shows a flowchart of steps by which a small business owner can set up the payment service to make future payments of future invoices submitted by future payees. At step 802, the small business owner interacts with the user interface of the payment service installed on their client to log on and configure the payment service for making future payments. The system responds by providing the small business owner with an option to configure future payments by spend category or by merchant. At step 804, the small business owner sets up a payment method (i) by spend category, where for all merchants in a specified spend category (where the category can be self-defined), a payment is to be made 'X' days before a due date of the invoice by using a specified account (e.g., make the payment with a payment method 'Y'); or (ii) by merchant, where the payment is always made to this particular merchant by using a specified account (e.g., make the payment with a payment method 'Z') 'A' days before the due date of the corresponding invoice from this particular merchant. To this input from the small business owner, the system responds by correspondingly configuring the desired payment method as specified by the small business owner. The system will show what will affect invoices that are scheduled and are already have a configured payment method. The small business owner may choose to override these payment configurations on a one-off or 'demand' basis.

At step 806 of Method 800, the small business owner may also include additional rules, such as a rule to pay by a preferred payment method unless one of the following conditions hold: (i) only pay from this credit card account if the remaining credit after the payment will still be above a certain level; (ii) only pay from this account if the currency balance after the payment will still be above a certain level. The owner may be able to select an alternate method or to force a manual decisioning of the account from which the payment of an invoice is to be made. The response by the system is to refine and save the payment method configuration for invoices in designated spend categories or for designed merchants from whom invoices will be received. Alternatively, at step 808, the small business owner may also configure payments for merchants selected from the biller directory.

A method 900 shows a flowchart of steps by which an issuer of accounts can target merchants-suppliers who do not accept non-cash transactions to pay their invoices. The purpose of such targeting is to convince the targeted merchants of the merits of accepting cashless payments for their invoices, such as payment from credit and debit accounts. At step 802, the issuer logs in and requests to view merchant acceptance reports. The system responds by providing the issuer with access to reports such as transaction volume and count by merchants/suppliers who are not credit/debit card acceptors. Reports can be segmented by (i) the type(s) of goods and/or services provided by the merchants-suppliers (e.g.; Merchant Category Codes (MCC)); and/or (ii) their respective geography(ies). At step 904, the issuers can offer the reports from step 902 to the merchants' acquirers who can then target those merchants with correspondence detailing the merits of accepting cashless-payment for invoices (e.g., payment from credit and/or debit accounts).

Alternatively, at step 906: (i) When a cardholder (CH) or account holder makes pays a merchant who does not accept credit or debit account payments, the issuer can also configure the payment request to ask the merchant to begin accepting credit/debit account payments. The transaction handler (i.e., Visa, MasterCard, etc.) may also be able to use this information across all of its issuers and/or acquirers; and (ii) issuers can also send messages to a cardholder (CH) or account holder relaying that, of the merchants that they which to pay with using this solution but are paying with cash or check, certain of those merchant will also accept payments from their credit/debit accounts, which merchants will also award the account holder with loyalty rewards for using those accounts.

Figure 10:
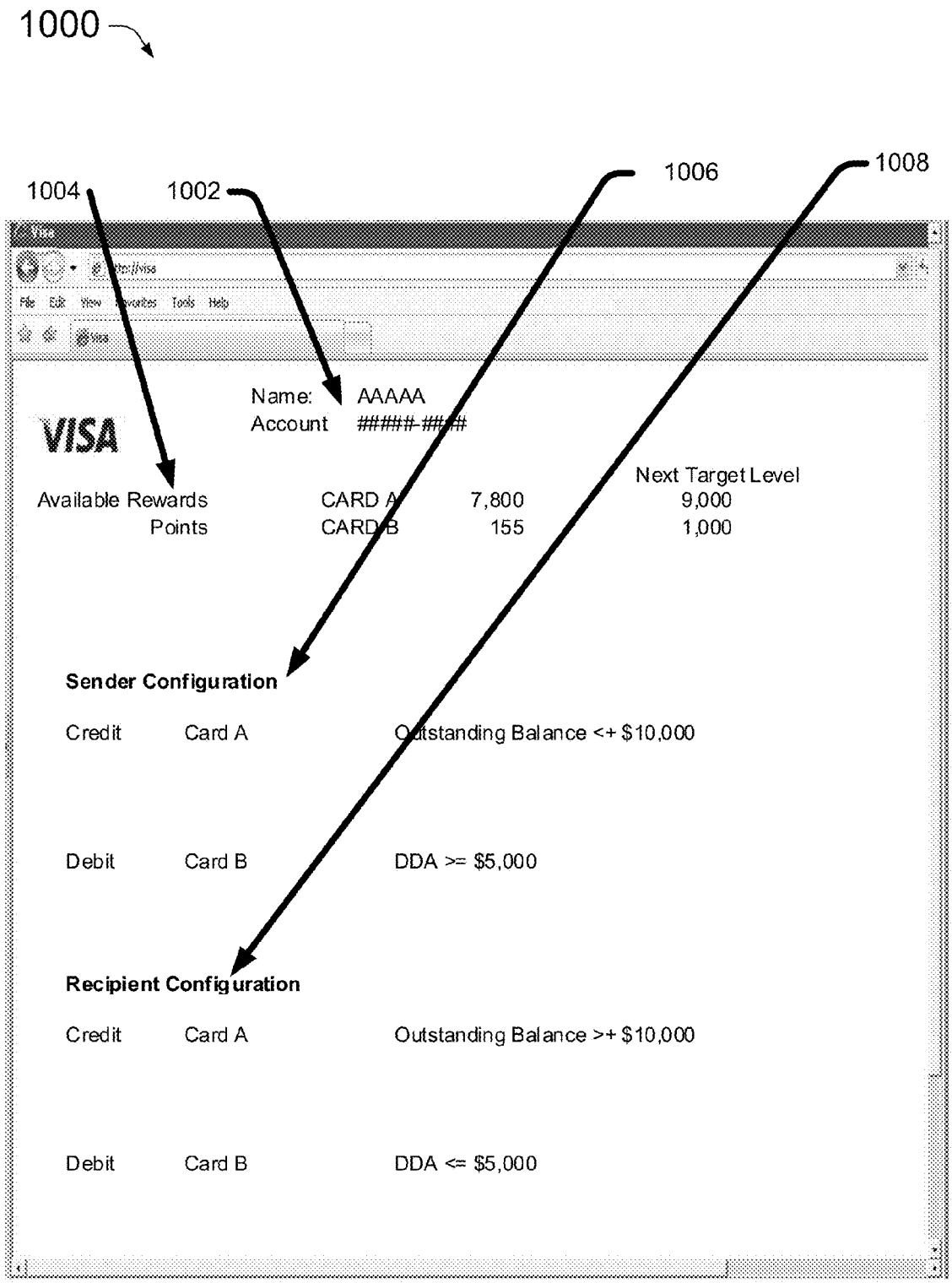
FIGS. 10-12 depict respective screen shots from an exemplary user interface for the methods depicted in the flowcharts of FIGS. 4-9.

FIG. 10 depicts a screen shot 1000 from an exemplary user interface rendered by a payment service application executing on a client by which a small business owner can pay accounts payable while optimizing the payment mix to get the rewards that are desired as quickly as possible given selected other constraints. At reference numeral 1002, the name and account of the small business owner is rendered. Reference numeral 1004 shows what reward points are the reward loyalty currency balance for each of Card A and Card B. For credit card A, it is shown that the current loyalty reward balance is 7,800 and the next target threshold of loyalty reward currency is 9,000. For debit card B, it is shown that the current loyalty reward balance is 155 and the next target threshold of loyalty reward currency is 1,000. The thresholds for cards A and B can be user supplied or retrieved by the system.

The accounts from which payments can be paid are seen in the list at reference numeral 1006, including credit Card A and debit Card B. For credit Card A, it has been specified that payments are to be made from this account only if the amount of credit extending on the Card A is under Ten Thousand Dollars ($10,000 US). For debit Card B, it has been specified that payments are to be made from this account, which is a Direct Deposit Account (DDA), only if the current balance is at least Five Thousand Dollars ($5,000 US).

The accounts into which account receivable payments will be paid are seen in the list at reference numeral 1008, including credit Card A and debit Card B. For credit Card A, it has been specified that payments are to be made into this account when the amount of credit extended on the card is at least Ten Thousand Dollars ($10,000 US). For debit Card B, it has been specified that payments are to be made into this account, which is a Direct Deposit Account (DDA), whenever the currency balance is Five Thousand Dollars ($5,000 US) or less.

Figure 11:
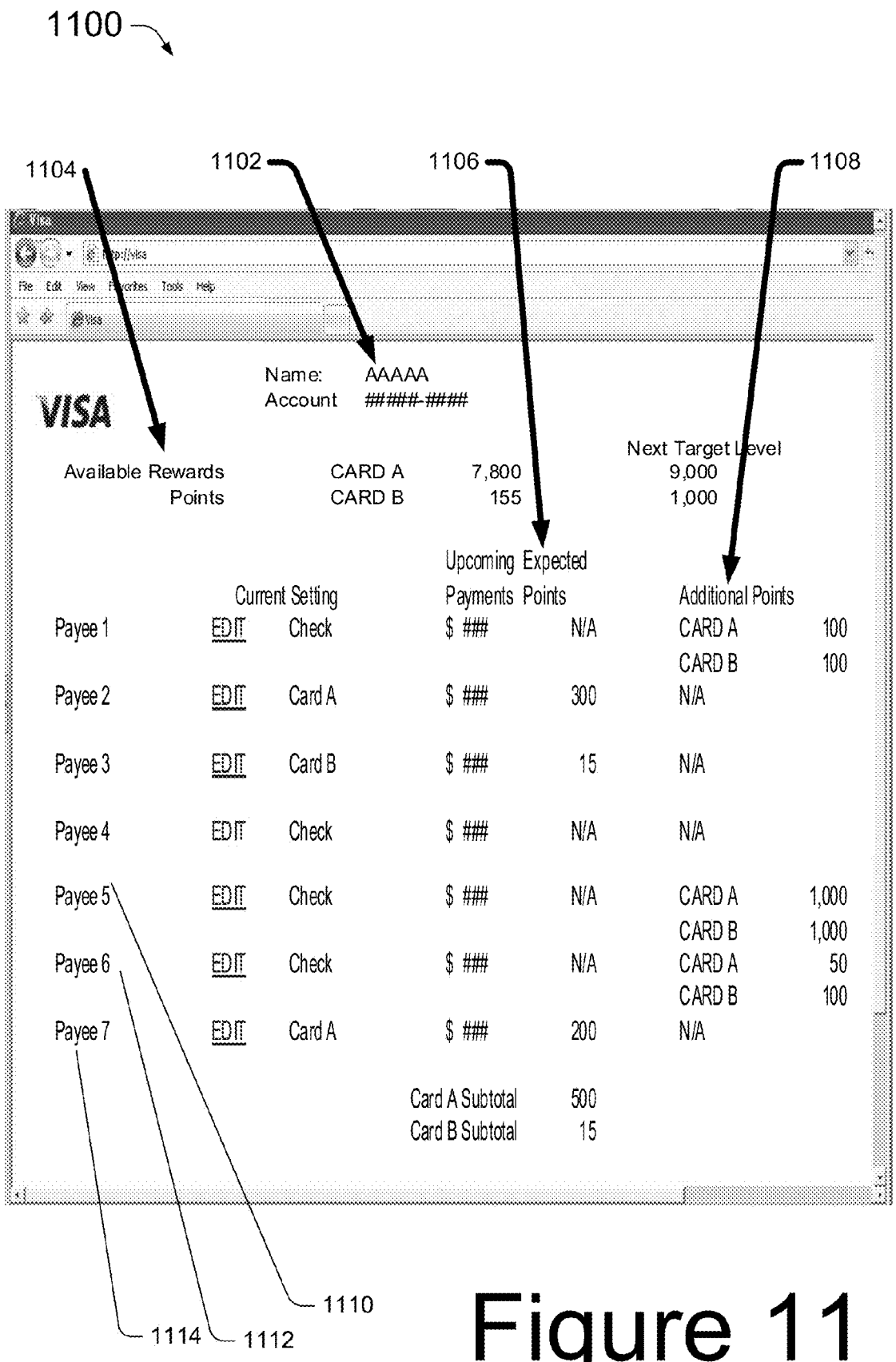

FIG. 11 depicts a screen shot 1100 from an exemplary user interface rendered by a payment service application executing on a client and by which a small business owner can direct money from the right payment source for the payer to the right payment source for the payee. Small businesses may thus pay with a specific card (i.e., a credit or debit account) and be paid by certain specific businesses or customers to a pre-designated card whether a credit or a debit card (i.e., a credit or debit account).

Decision of which card to route payment to could be based upon criteria, as mentioned above, such as: (i) Geography of payer or where service was rendered; (ii) the type of goods and/or services supplied by the payee or payer (e.g., a Merchant Commodity Code (MSS) of the payer or payee); (iii) the size of existing an bank balance (for instance if the currency balance in an account is above certain level, then all incoming payments will be made to reduce the credit presently extended on a credit card as opposed to the debit card). As seen in screen shot 1100, a user can specify what payment cards are to be used to pay with and what cards should be use to be receive payment. Although not shown, a screen can be rendered on the user interface of the client that allows a user to specify rules to the effect that all payments received into an account are to be based upon (i) the identity of the payer making the payment; (ii) a category into which the payer making the payment is classified (e.g.; the Merchant Category Codes (MCC) of the payer); (iii) the geography(ies) of the payer; (iv) the location at which the goods and/or services were tendered in the transaction for which the payment is being made; (v) whether a particular good and/or service had been any part of the transaction for which the payment is being made; (vi) a combination of the foregoing; or (vii) other such user-specified rule(s) for specifying an account into which a payment is to be received. Of course, if the payment is being made using a debit and/or credit account, the receipt of the payment into the designated account may be conditioned upon authentication of the proposed debit and/or credit account(s). An Cardholder Verification (CVV2) and/or an Address Verification Service (AVS) for the proposed account(s) can be used by the payment service such authentication(s).

Once a small business owner has enrolled, and their credit and/or debit accounts been validated by the payment service, the payment system can be operated by hardware and software to automatically pay invoices received from suppliers from the small business owners debit and/or credit accounts. The accounts receiving payments and being used to make payments can be authenticated respectively by a corresponding Cardholder Verification (CVV2) and/or an Address Verification Service (AVS).

The automation of the payment service can include automatic optimization of each such payment so that the corresponding payment account will be selected that will receive maximum loyalty rewards as described herein. Alternatively, optimization may be directed by an account holder to a specific loyalty reward currency. For instance, an account holder/cardholder may prefer that their frequent flyer miles be maximized, as opposed to other loyalty reward currencies, because the cardholder wants to get a free ticket in time for an upcoming trip. As such, the optimization by the payment service allows the cardholder to select which loyalty reward currency, among other such loyalty reward currencies, that is to be optimized. Given this perspective of optimization, a particular loyalty reward currency that is being optimized by the payment service may not necessarily have a value that is the highest value in terms of convertible monetary value.

The payment system can be operated by hardware and software to automatically receive payment of the small business owner's invoices into the small business owners debit and/or credit accounts, which payments are optionally received as payments made from the debit and/or credit accounts for payers and conditioned upon the validation/authentication of such accounts by a corresponding Cardholder Verification (CVV2) and/or an Address Verification Service (AVS) for the respective payer accounts.

Reference numeral 1102 in FIG. 11 corresponds to reference numeral 1002 in FIG. 10, where reference numeral 1104 shows what reward points are the reward loyalty currency balance for each of Card A and Card B. Payees 5 through 7 are seen at reference numerals 110 through 1114, where Payee 5 is to be paid by check, but can earn 1000 points in loyalty reward currency if paid by either of Card A or Card B, where Payee 6 is to be paid by check, but can earn 50 points in loyalty reward currency if paid by Card A and twice that if paid by Card B, and where Payee 7 is to be paid by Card A but will not realize any loyalty reward currency by such payment. A sum total of expected points to earned by the planned payments is shown at the bottom of the column at reference numeral 1106 for each of Card A and Card B. An edit field is provided to change the account from which each payee is to be paid.

Figure 12:
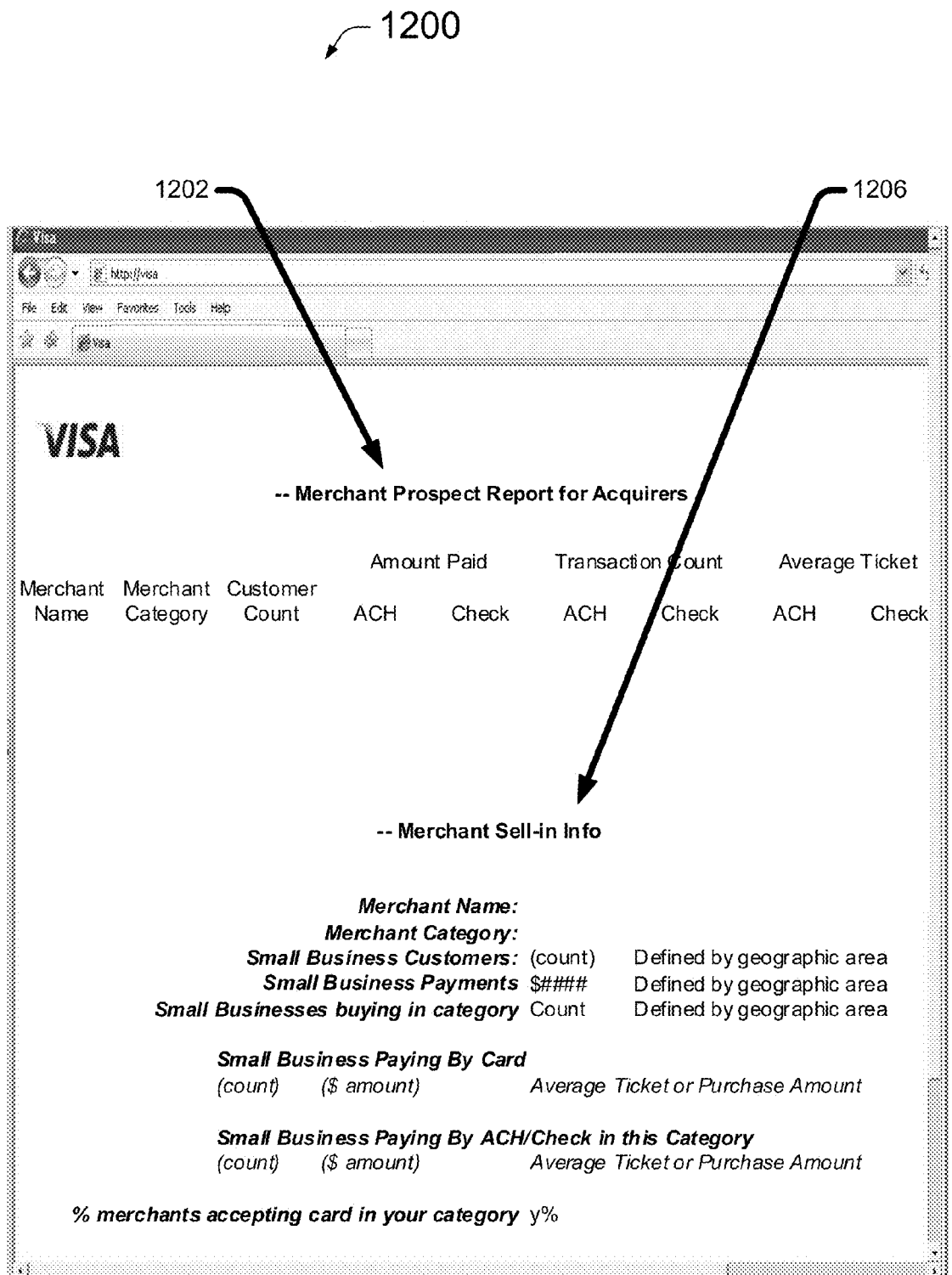

FIG. 12 depicts a screen shot 1200 from an exemplary user interface of a payment service application executing on a client by which an issuer can be provided with information about those merchants which do not accept payments from their cardholders. Issuers can aggregate this information and sell it to acquirers as prospect lists, such as is show at reference numeral 1202. The system will also provide information to support individual 'sell-ins' to a merchant to accept cards, as seen at reference numeral 1204. For instance, a sales person can point to a number of card payments that the merchant's competitors have been receiving that the merchant does not get in a certain geographic area.

The methods and screen shots described above provide examples of a payment service that provides a solution to the problem of low transaction volumes for small businesses in accepting payments from debit and/or credit accounts. Implementations of the disclosed payment service lower the initial cost of investing in card-payment terminals that would be otherwise difficult for acquirers to recoup for their small businesses. Implementations of the disclosed payment service also remove the difficulty for an acquirer to inexpensively find and sell the acceptance of payments on credit and/or debit accounts into small businesses, thereby making it less of a challenge for the acquirer to convert, and the merchants to accept, credit and/or debit account payments. As credit and debit accounts are already distributed to most small businesses, the implementations of the payment service disclosed herein provide for a low cost way to rapidly find and convert small businesses into credit and/or debit account acceptors.

Implementations of the payment service disclosed make it easier for merchants to accept payments of their accounts receivables, and provide an ability for these merchants to bill their customers electronically and thus be able to electronically their record-keeping, thus saving those merchants time while keeping their accounts receivables organized. These small businesses can bill either consumers or the small businesses that owe them accounts receivables. The recipients of these merchants' invoices can use implementations of the disclosed payment service to rapidly acknowledge the invoice and to pay the invoice using a debit and/or credit account and thereby realize a loyalty reward that is automatically optimized across all of the payers debit or credit accounts.

The following is a list of benefits and features provided by the implementations of the disclosed payment service to account holders who can use their credit and/or debit accounts to pay their accounts payables:

1. Access web-based bill payment service through link provided by transaction handler, card issuer, biller, or biller's website;
2. Enroll for the payment service by entering password, and receive notification and alert preferences, SMS details, card number, and other profile information
3. Once enrolled, use web or mobile device interface to interact with the payment service
4. Select billers from a biller directory
5. Set up personalized payee list, or "Quick List"
6. Maintain Quick List by adding and modifying at any time
7. Receive invoices from participating billers
8. Receive alerts about incoming invoices via mobile or email, subject to sender's request for alerts during enrollment process 9. Initiate a payment by entering payment details, invoice data, biller's alias found in the biller directory, spend category, personal memo text, biller memo text and date
10. Schedule recurring payments by adding recurrence information
11. Reconcile accounts payable by matching payments to invoices received by participating billers (manual reconciliation of payments to invoices received outside the system can also be facilitated)
12. Receive confirmation that payment has been made to the channel of choice: Internet, mobile
13. If desired payee is not already in the biller directory, initiate payment request by entering payment details and biller contact information (contact information to serve as temporary "alias")
14. Send link to the payment service to payees to invite them to enroll
15. View, print reports: Outstanding invoices; Past due invoices; Scheduled payments; Past payments; Payments by spend category; Expired payment requests
16. Get customer support The following is a list of benefits and features provided by the implementations of the disclosed payment service to account holders who can use credit and debit accounts to receive payment of their accounts receivables:

1. Access web-based bill payment service through link obtained in one of three ways: (i) sent by the transaction handler, account issuer, as part of the marketing of the payment service, (ii) sent directly by the payment service as a result of a customer making a payment request, (iii) sent by the customer to request biller enrollment
2. Accept one-time payment (before biller enrollment) through the user interface using the claim code supplied by customer
3. Receive prompt to enroll, upon accepting one-time payment; enrollment details will be copied from those supplied when accepting the one-time payment
4. Enroll for the payment service by entering profile information and destination account information.
5. Change destination account information at any time
6. Once enrolled, use web or mobile interface to interact with the payment service
7. Incoming receivables will be posted quickly and automatically, with no action required
8. Drive customers from biller website to the payment service through a link
9. Customize payment web page with name, logo, and with multiple configurable fields for customers that access the payment service via a link on the biller's website
10. Configure layout of invoices, including logo, biller alias, name, address, and phone number
11. Set up one-time, scheduled, or recurring electronic invoices to customers
12. Reconcile small business accounts receivable invoices to incoming payments automatically
13. Reconcile other invoices to incoming payments using invoice data entered by sender on the payment
14. Send payment service link to customers that pay by check to encourage future payments to be made online, preferably using the convenience of a debit and/or credit account
15. Create extract of payments for financial software (i.e., Excel, Quicken, Quickbooks, etc.)
16. Upload Quickbooks or similar financial software invoice file
17. Get customer service
18. View, print reports by sender, time period: (a) Payment history; (b) Overdue invoices: 30 days, 45 days, 60 days, 90 days, write-offs; (c) Underpayments; (d) Outstanding invoices; (e) Received; (f) Reconciled; (g) Unreconciled payments; (h) Scheduled invoices; (i) Payer details
19. View, print reports by sender, time period Support discounts to cardholders for early payment
20. Offer goods and services via Short Message Service (SMS) short code The following is a list of benefits and features provided by the implementations of the disclosed payment service to account holders who use credit and/or debit accounts to pay or be paid.

1. Payer accesses payment service via link supplied by biller and enrolls
2. Biller creates customized, branded webpage for customer payment and adds link to it from the biller's website
3. Biller accesses payment service via link supplied by its customer and enrolls
4. Payer makes payment to unenrolled biller
5. Payer makes payment to enrolled biller
6. Biller sends an invoice to customer
7. Biller reconciles payment to invoice
8. Biller rejects transaction with memo: "not my customer" or "doesn't owe me money right now"
9. Payer dispute: Payer was debited but biller claims not to have received payment
10. Dispute transaction: Payer says they sent the payment but the payment did not arrive
11. Chargeback: Issue of the Payer's account charges the payment back (biller has already been paid)

As can be seen from the forgoing, implementations of the disclosed payment service enable the infrastructure of a transaction handler within a payment processing system, such as depicted in FIG. 13 as described below, to process the payments from a payer to a payee. The infrastructure can be used to "pull" payments from the payer account or "push" payments to the payee account. The payment processing system can be used to facilitate aspects of the payment from authorization to settlement.

Exemplary Payment Processing System

As background information for the foregoing description, as will be readily understood by persons of ordinary skill in the relevant arts, a transaction such as occurs in a payment system can include participation from different entities that are each a component of the payment processing system. The payment processing system includes an issuer; a transaction handler; an acquirer; the merchant; and the consumer. The acquirer and the issuer can communicate through the transaction handler. The merchant may communicate with the acquirer, the transaction handler, or the issuer within the payment processing system.

Typically, a transaction begins with the consumer presenting an account number of the account to the merchant to initiate an exchange for a good or service when conducting a transaction with the merchant. The consumer may be an individual or a corporate entity. The consumer may be an account holder of the account issued by the issuer such as a joint account holder of the account or a person having access to the account such as an employee of a corporate entity having access to a corporate account.

The merchant sends a transaction authorization request to the issuer of the consumer's account. The issuer may submit an authorization response for the transaction via the transaction handler. Authorization includes the issuer, or the transaction handler on behalf of the issuer, authorizing the transaction in connection with instructions of the issuer, such as through the use of business rules. The transaction handler may maintain a log or history of authorized transactions. Once approved, the merchant can record the authorization and allow the consumer to receive the good or service.

The merchant may, at discrete periods, such as the end of the day, submit a list of authorized transactions to the acquirer or other components of the payment processing system for clearing and settling. The transaction handler may compare the submitted authorized transaction list with its own log of authorized transactions. If a match is found, the transaction handler may route the clearing and settling request from the corresponding acquirer to the corresponding issuer involved in each transaction. Once the acquirer receives the payment of the transaction from the issuer, it can forward the payment to the merchant less any transaction costs, such as fees. If the transaction involves a debit or pre-paid card, the acquirer may choose not to wait for the initial payment prior to paying the merchant.

There may be intermittent steps in the foregoing process, some of which may occur simultaneously. For example, the acquirer can initiate the clearing and settling process, which can result in payment to the acquirer for the amount of the transaction. The acquirer may request from the transaction handler that the transaction be cleared and settled.

FIG. 13 illustrates an exemplary payment processing system 1300. Payment processing system can be operated in the environment of FIG. 1 which an announcement recipient of the implementations disclosed herein can receive an announcement. In the general environment of FIG. 13, a merchant (m) 1310 can conduct a transaction for goods and/or services with an account user (au) 1308 on an account issued to an account holder (a) 1308 by an issuer (i) 1304, where the processes of paying and being paid for the transaction are coordinated by a transaction handler (th) 206. The transaction includes participation from different entities that are each a component of the payment processing system 1300. The payment processing system 1300 has a plurality of merchants (m) 1310 that includes merchant (1) 1310 through merchant (M) 1310, where M can be up to and greater than an eight digit integer.

Payment processing system 1300 has a plurality of accounts 1308 each of which is held by a corresponding account holder (1) 1308 through account holder (A) 1308, where A can be up to and greater than a ten digit integer.

Payment processing system 1300 includes account user (1) 1308 through account user (AU) 1308, where AU can be as large as a ten digit integer or larger. Each account user (au) conducts a transaction with merchant (m) 1310 for goods and/or services using the account that has been issued by an issuer (i) 1304 to a corresponding account holder (a) 1308. Data from the transaction on the account is collected by the merchant (m) 1310 and forwarded to a corresponding acquirer (a) 1306. Acquirer (a) 1306 forwards the data to transaction handler 1302 (th) who facilitates payment for the transaction from the account issued by the issuer (i) 1304 to account holder (a) 1308. The payment processing system 1300 can have a plurality of transaction handlers 1302 (th), where 'th' can be an integer from 1 to TH, and where 'TH' can be as large as an eight digit integer or larger.

Payment processing system 1300 has a plurality of issuers (1-I) 1304. Each issuer (i) 1304 may be assisted in processing one or more transactions by a corresponding agent issuer (ai) 1304, where 'i' can be an integer from 1 to I, where 'ai' can be an integer from 1 to AI, and where I and AI can be as large as an eight digit integer or larger.

Payment processing system 1300 has a plurality of acquirers (q) 1306. Each acquirer (q) 1306 may be assisted in processing one or more transactions by a corresponding agent acquirer (aq) 1306, where 'q' can be an integer from 1 to Q, where aq can be an integer from 1 to AQ, and where Q and AQ can be as large as a eight digit integer or larger.

The transaction handler 1302 (th) may process a plurality of transactions within the payment processing system 1300. The transaction handler 1302 (th) can include one or a plurality or networks and switches (ns) 1302. Each network/switch (ns) 1302 can be a mainframe computer in a geographic location different than each other network/switch (ns) 1302, where 'ns' is an integer from one to NS, and where NS can be as large as a four digit integer or larger.

Dedicated communication systems 1320, 1322 (e.g., private communication network(s)) facilitate communication between the transaction handler 1302 (th) and each issuer (i) 1304 and each acquirer (a) 1306. The Network 1312, via e-mail, the World Wide Web, cellular telephony, and/or other optionally public and private communications systems, can facilitate communications 1322a-1322e among and between each issuer (i) 1304, each acquirer (a) 1306, each merchant (m) 1310, each account holder (a) 1308, and the transaction handler 1302 (th). Alternatively and optionally, one or more dedicated communication systems 1324, 1326, and 1328 can facilitate respective communications between each acquirer (a) 1306 and each merchant (m) 1310, each merchant (m) and each account holder (a) 1308, and each account holder (a) 1308 and each issuer (i) 1304, respectively.

Each acquirer (q) 1306 may be assisted in processing one or more transactions by a corresponding agent acquirer (aq) 1306, where 'q' can be an integer from 1 to Q, where aq can be an integer from 1 to AQ, and where Q and AQ can be as large as a eight digit integer or larger.

Merchant (m) 1310 may be a person or entity that sells goods and/or services. Merchant (m) 1310 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 1308 may be a second merchant (m) 1310 making a purchase from another merchant (m) 1310. Merchant (m) 1310 may utilize at least one point-of-interaction terminal (e.g., Point of Service or browser enabled consumer cellular telephone) that can communicate with the account user (au) 1308, the acquirer (a) 1306, the transaction handler 1302 (th), or the issuer (i) 1304. Thus, the point-of-interaction terminal is in operative communication with the payment processing system 1300.

Typically, a transaction begins with account user (au) 1308 presenting the portable consumer device to the merchant (m) 1310 to initiate an exchange for a good or service. The portable consumer device may be associated with an account (e.g., a credit account) of account holder (a) 1308 that was issued to the account holder (a) 1308 by issuer (i) 1304.

The portable consumer device may be in a form factor that can be a payment card, a gift card, a smartcard, a smart media, a payroll card, a healthcare card, a wrist band, a machine readable medium containing account information, a keychain device, such as a SPEEDPASS® device commercially available from ExxonMobil Corporation, a supermarket discount card, a cellular telephone, personal digital assistant, a pager, a security card, an access card, a wireless terminal, or a transponder. The portable consumer device may include a volatile or non-volatile memory to store information such as the account number or an account holder (a) 1308's name.

Merchant (m) 1310 may use the point-of-interaction terminal to obtain account information, such as a number of the account of the account holder (a) 1308, from the portable consumer device. The portable consumer device may interface with the point-of-interaction terminal using a mechanism including any suitable electrical, magnetic, or optical interfacing system such as a contactless system using radio frequency or magnetic field recognition system or contact system such as a magnetic stripe reader. The point-of-interaction terminal sends a transaction authorization request to the issuer (i) 1304 of the account associated with the portable consumer device. Alternatively, or in combination, the portable consumer device may communicate with issuer (i) 1304, transaction handler 1302 (th), or acquirer (a) 1306.

Issuer (i) 1304 may authorize the transaction and forward same to the transaction handler 1302 (th). Transaction handler 1302 (th) may also clear the transaction. Authorization includes issuer (i) 1304, or transaction handler 1302 (th) on behalf of issuer (i) 1304, authorizing the transaction in connection with issuer (i) 1304's instructions such as through the use of business rules. The business rules could include instructions or guidelines from the transaction handler 1302 (th), the account holder (a) 1308, the merchant (m) 1310, the acquirer (a) 1306, the issuer (i) 1304, a related financial institution, or combinations thereof. The transaction handler 1302 (th) may maintain a log or history of authorized transactions. Once approved, the merchant (m) 1310 may record the authorization, allowing the account user (au) 1308 to receive the good or service from merchant (m) or an agent thereof.

The merchant (m) 1310 may, at discrete periods, such as the end of the day, submit a list of authorized transactions to the acquirer (a) 1306 or other transaction related data for processing through the payment processing system 1300. The transaction handler 1302 (th) may compare the submitted authorized transaction list with its own log of authorized transactions. The transaction handler 1302 (th) may route authorization transaction amount requests from the corresponding acquirer (a) 1306 to the corresponding issuer (i) 1304 involved in each transaction. Once the acquirer (a) 1306 receives the payment of the authorized transaction from the issuer (i) 1304, the acquirer (a) 1306 can forward the payment to the merchant (m) 1310 less any transaction costs, such as fees for the processing of the transaction. If the transaction involves a debit or pre-paid card, the acquirer (a) 1306 may choose not to wait for the issuer (i) 1304 to forward the payment prior to paying merchant (m) 1310.

There may be intermittent steps in the foregoing process, some of which may occur simultaneously. For example, the acquirer (a) 1306 can initiate the clearing and settling process, which can result in payment to the acquirer (a) 1306 for the amount of the transaction. The acquirer (a) 1306 may request from the transaction handler 1302 (th) that the transaction be cleared and settled. Clearing includes the exchange of financial information between the issuer (i) 1304 and the acquirer (a) 1306 and settlement includes the exchange of funds. The transaction handler 1302 (th) can provide services in connection with settlement of the transaction. The settlement of a transaction includes depositing an amount of the transaction settlement from a settlement house, such as a settlement bank, which transaction handler 1302 (th) typically chooses, into a clearinghouse, such as a clearing bank, that acquirer (a) 1306 typically chooses. The issuer (i) 1304 deposits the same from a clearinghouse, such as a clearing bank, which the issuer (i) 1304 typically chooses, into the settlement house. Thus, a typical transaction involves various entities to request, authorize, and fulfill processing the transaction.

The payment processing system 1300 will preferably have network components suitable for scaling the number and data payload size of transactions that can be authorized, cleared and settled in both real time and batch processing. These include hardware, software, data elements, and storage network devices for the same. Examples of payment processing system 1300 include those operated, at least in part, by: American Express Travel Related Services Company, Inc; MasterCard International, Inc.; Discover Financial Services, Inc.; First Data Corporation; Diners Club International, LTD; Visa Inc.; and agents of the foregoing.

Each of the network/switch (ns) 1302 can include one or more data centers for processing transactions, where each transaction can include up to 100 kilobytes of data or more. The data corresponding to the transaction can include information about the types and quantities of goods and services in the transaction, information about the account holder (a) 1308, the account user (au) 1308, the merchant (m) 1310, tax and incentive treatment(s) of the goods and services, coupons, rebates, rewards, loyalty, discounts, returns, exchanges, cash-back transactions, etc.

By way of example, network/switch (ns) 1302 can include one or more mainframe computers (e.g., one or more IBM mainframe computers) for one or more server farms (e.g., one or more Sun UNIX Super servers), where the mainframe computers and server farms can be in diverse geographic locations.

Each issuer (i) 1304 (or agent issuer (ai) 1304 thereof) and each acquirer (a) 1306 (or agent acquirer (aq) 1306 thereof) can use or more router/switch (e.g., Cisco™ routers/switches) to communicate with each network/switch (ns) 1302 via dedicated communication systems.

Transaction handler 1302 (th) can store information about transactions processed through payment processing system 1300 in data warehouses such as may be incorporated as part of the plurality of networks/switches 1302. This information can be data mined. The data mining transaction research and modeling can be used for advertising, account holder and merchant loyalty incentives and rewards, fraud detection and prediction, and to develop tools to demonstrate savings and efficiencies made possible by use of the payment processing system 1300 over paying and being paid by cash, or other traditional payment mechanisms.

The VisaNet® system is an example component of the transaction handler 1302 (th) in the payment processing system 1300. Presently, the VisaNet® system is operated in part by Visa Inc. As of 2007, the VisaNet® system Inc. was processing around 300 million transaction daily, on over 1 billion accounts used in over 170 countries. Financial instructions numbering over 16,000 connected through the VisaNet® system to around 30 million merchants (m) 1310. In 2007, around 81 billion transactions for about 4 trillion U.S. dollars were cleared and settled through the VisaNet® system, some of which involved a communication length of around 24,000 miles in around two (2) seconds.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements. Moreover, it is understood that a functional step of described methods or processes, and combinations thereof can be implemented by computer program instructions that, when executed by a processor, create means for implementing the functional steps.

The instructions may be included in computer readable medium that can be loaded onto a general purpose computer, a special purpose computer, or other programmable apparatus.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A method, comprising:
   determining, from prior transactions conducted on a plurality of reward accounts of a payer with one or more merchants, each of a plurality of account payables that corresponds to the one or more merchants;
   deriving information for payment of each of the plurality of account payables from the prior transactions;
   finding, for an account payable of the plurality of account payables, a reward account of the plurality of reward accounts eligible to receive a largest deposit to a loyalty reward balance by a payment of the account payable;
   determining, via a computing apparatus, that a currency balance for the reward account is not sufficient for the payment of the account payable;
   ascertaining, via the computing apparatus, that a deposit to the reward account of one or more account receivables will increase the currency balance of the reward account sufficiently for the payment of the account payable;
   sending a request to initiate a deposit of the one or more account receivables to the reward account, and the payment of the account payable by a withdrawal from the currency balance of the reward account, wherein the request is to be rendered by a client device for display to the payer; and
   initiating the deposit of the one or more account receivables to the reward account, and the payment of the account payable by a withdrawal from the currency balance of the reward account.

2. The method of claim 1, wherein the account receivables comprise a first account receivable owed by a payee, and the initiating the payment of the account payable is preceded by an offer to the payee to pay the account payable with the reward account.

3. The method of claim 1, wherein each respective reward account of the plurality of reward accounts is issued to a payer by an issuer to conduct transactions with merchants on the respective reward account.

4. The method of claim 3, further comprising deriving information for receipt of a payment of at least one of the account receivables from prior transactions that were conducted with one or more of the merchants.

5. The method of claim 1, wherein:
   the reward account corresponds to a first authentication account;
   the deposit of the one or more account receivables is paid by at least one second authentication account;
   the finding of the reward account is performed after authenticating the first authentication account with at least one of a cardholder verification and an address verification service; and
   the ascertaining is performed after authenticating the at least one second authentication account with at least one of a cardholder verification and an address verification service.

6. A method, comprising:
   receiving a threshold value selected by an account holder on a user interface of a client device;
   selecting a first reward account from a plurality of reward accounts of the account holder, each of the reward accounts being eligible for a respective reward for payment of an account payable, and the first reward account being eligible for a first reward having a highest value of the respective rewards, wherein the selecting the first reward account is done subject to the threshold value;
   determining that a currency balance of the first reward account is not sufficient to pay the account payable;
   identifying, via a computing apparatus, at least one account receivable for raising the currency balance of the first reward account sufficiently to pay the account payable;
   sending, for display on the client device, a reward currency balance for each of the plurality of reward accounts;
   sending a request, for display to the account holder on the client device, to initiate a deposit of the at least one account receivable into the first reward account and a payment of the account payable from the first reward account; and
   in response to a selection by the account holder, initiating the deposit of the at least one account receivable into the first reward account, and the payment of the account payable from the first reward account.

7. The method of claim 6, wherein each of the reward accounts uses a respective reward currency, and the selecting the first reward account comprises determining a respective value of the respective reward currency for each reward account, and ranking each reward account based on the respective value.

8. The method of claim 6, wherein the payment of the account payable is for a transaction between the account holder and a merchant.

9. The method of claim 8, further comprising sending, for display on the client device, a reward currency balance for each of the plurality of reward accounts.

10. The method of claim 8, wherein each of the plurality of reward accounts is issued to the account holder by a respective issuer in order to conduct transactions with merchants, and each of the merchants submits transactions to a respective acquirer.

11. The method of claim 6, wherein the computing apparatus comprises one or more servers.

12. The method of claim 6, further comprising receiving payer data from the client device, and enrolling the account holder in a payment processing service that handles payments of a plurality of accounts payable for the account holder including the payment of the account payable.

13. The method of claim 1, further comprising:
   communicating with a transaction handler to determine, from the prior transactions conducted on the plurality of reward accounts, each of the account receivables that corresponds to the one or more merchants;
   deriving information for receipt of a payment for each of the account receivables; and
   sending the derived information to the client device for rendering by the client device.

14. A non-transitory computer-readable storage medium storing computer-readable instructions, which when executed, cause a computing apparatus to:
   select a first reward account from a plurality of reward accounts of an account holder, each of the reward accounts being eligible for a respective reward for payment of an account payable, and the first reward account being eligible for a first reward having a highest value of the respective rewards;

determine, via a computing apparatus, that a currency balance of the first reward account is not sufficient to pay the account payable;

identify, via the computing apparatus, at least one account receivable for raising the currency balance of the first reward account sufficiently to pay the account payable;

send, for display on a client device of the account holder, a reward currency balance for each of the plurality of reward accounts;

send a request, for display to the account holder on the client device, to initiate a deposit of the at least one account receivable into the first reward account, and a payment of the account payable from the first reward account; and in response to a selection by the account holder, initiate the deposit of the at least one account receivable into the first reward account, and the payment of the account payable from the first reward account.

15. The storage medium of claim 14, wherein each of the reward accounts uses a respective reward currency, and the selecting the first reward account comprises determining a respective value of the respective reward currency for each reward account, and ranking each reward account based on the respective value.

16. The storage medium of claim 14, wherein the instructions further cause a computing apparatus to receive a threshold value from an account holder, and wherein the selecting the first reward account is done subject to the threshold value.

17. The storage medium of claim 14, wherein the payment of the account payable is for a transaction between the account holder and a merchant.

18. A system, comprising:
at least one server; and
memory storing instructions configured to instruct the at least one server to:
receive a threshold value selected by an account holder on a user interface of a client device;
select a first reward account from a plurality of reward accounts of the account holder, each of the reward accounts being eligible for a respective reward for payment of an account payable, and the first reward account being eligible for a first reward having a highest value of the respective rewards, wherein the selecting the first reward account is done subject to the threshold value;
determine that a currency balance of the first reward account is not sufficient to pay the account payable;
identify at least one account receivable for raising the currency balance of the first reward account sufficiently to pay the account payable;
send, for display on a client device of the account holder, a reward currency balance for each of the plurality of reward accounts;
send a request, for display to the account holder on the client device, to initiate a deposit of the at least one account receivable into the first reward account and a payment of the account payable from the first reward account; and
in response to a selection received from the account holder, initiate the deposit of the at least one account receivable into the first reward account, and the payment of the account payable from the first reward account.

19. The system of claim 18, further comprising a transaction handler, and wherein the instructions further instruct the at least one server to:
communicate with the transaction handler to determine, from prior transactions conducted on the plurality of reward accounts with one or more merchants, each of a plurality of account payables, including the account payable, that corresponds to the one or more merchants;
derive information for payment of each of the plurality of account payables from the prior transactions; and
send the derived information for rendering by the client device.

20. The system of claim 18, further comprising a transaction handler, and wherein the instructions further instruct the at least one server to:
communicate with the transaction handler to determine, from prior transactions conducted on the plurality of reward accounts with one or more merchants, each of the at least one account receivable that corresponds to the one or more merchants;
derive information for receipt of a payment for each of the at least one account receivable; and
send the derived information for rendering by the client device.

21. The system of claim 18, wherein the instructions further instruct the at least one server to receive payer data from the client device, and enroll the account holder in a payment processing service that handles payments of a plurality of accounts payable for the account holder including the payment of the account payable.

* * * * *